(12) United States Patent
Kim et al.

(10) Patent No.: US 7,616,963 B2
(45) Date of Patent: Nov. 10, 2009

(54) POSITIONING APPARATUS AND METHOD OF A MOBILE TERMINAL USING A POSITIONING SERVER INDEPENDENTLY CONSTRUCTED ON A NETWORK

(75) Inventors: Joo-Young Kim, Suwon-si (KR); Wuk Kim, Gwacheon-si (KR); Joon-Goo Park, Yongin-si (KR); Sang-Kyung Sung, Suwon-si (KR); Hyeon-Woo Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 290 days.

(21) Appl. No.: 11/109,999

(22) Filed: Apr. 20, 2005

(65) Prior Publication Data

US 2005/0239480 A1    Oct. 27, 2005

(30) Foreign Application Priority Data

Apr. 21, 2004    (KR)    ............... 10-2004-0027639

(51) Int. Cl.
*H04W 24/00*    (2009.01)
*H04W 0/00*    (2006.01)

(52) U.S. Cl. ............... 455/456.1; 455/456.3; 455/432.1

(58) Field of Classification Search ............... 455/414.1, 455/414.2, 422.1, 435.1, 456.1, 456.3, 456.5, 455/456.6, 457, 446, 432.1
See application file for complete search history.

(56) References Cited

U.S. PATENT DOCUMENTS

| | | | |
|---|---|---|---|
| 5,432,841 A | | 7/1995 | Rimer |
| 6,466,788 B1 * | | 10/2002 | Carlsson ............. 455/435.2 |
| 6,525,689 B2 * | | 2/2003 | Dooley et al. ............. 342/357.09 |
| 6,618,671 B2 * | | 9/2003 | Dooley et al. ............. 701/213 |
| 6,937,867 B2 * | | 8/2005 | Oda et al. ............. 455/456.1 |
| 6,975,871 B2 * | | 12/2005 | Shintai et al. ............. 455/456.1 |
| 7,039,427 B2 * | | 5/2006 | Tachikawa ............. 455/457 |
| 7,116,985 B2 * | | 10/2006 | Wilson et al. ............. 455/456.1 |
| 7,133,670 B1 * | | 11/2006 | Moll et al. ............. 455/432.1 |
| 7,218,940 B2 * | | 5/2007 | Niemenmaa et al. ............. 455/456.1 |
| 7,245,910 B2 * | | 7/2007 | Osmo ............. 455/432.1 |
| 7,246,010 B2 * | | 7/2007 | Alanen et al. ............. 701/213 |
| 7,277,711 B2 * | | 10/2007 | Nyu ............. 455/456.1 |
| 2002/0094822 A1 | | 7/2002 | Anctil et al. |
| 2003/0011511 A1 | | 1/2003 | King et al. |
| 2003/0027582 A1 | | 2/2003 | Hayashida |
| 2003/0210656 A1 * | | 11/2003 | Biacs et al. ............. 370/252 |
| 2005/0010663 A1 * | | 1/2005 | Tatman et al. ............. 709/224 |

FOREIGN PATENT DOCUMENTS

| | | |
|---|---|---|
| CN | 1394454 | 1/2003 |
| EP | 1 203 965 | 5/2002 |

(Continued)

*Primary Examiner*—Sonny Trinh
(74) *Attorney, Agent, or Firm*—The Farrell Law Firm, LLP

(57) ABSTRACT

A positioning apparatus and method of a mobile terminal using a positioning server independently constructed on a network. The positioning apparatus includes a positioning server, independently constructed on a network, for collecting and storing/managing assistant data that includes orbit information and correction information of a satellite, and providing the assistant data or position information using the assistant data in response to an external request. The positioning server provides the position information of the terminal subject to positioning in response to the request for the position information of the terminal subject to positioning created from at least one network among a plurality of networks that share the positioning server. Accordingly, an accurate positioning result can be obtained with a cost for implementation of the positioning system reduced.

26 Claims, 8 Drawing Sheets

FOREIGN PATENT DOCUMENTS

| | | |
|---|---|---|
| EP | 1 227 694 | 7/2002 |
| EP | 1 298 448 | 4/2003 |
| JP | 2003-052064 | 2/2003 |
| WO | WO 02/21873 | 3/2002 |

\* cited by examiner (MLP_SLIR)

| ms-ID | LCS-client-ID | PQoS |
|---|---|---|

FIG.7A (SUPL_INIT)

| session_ID | Home SLC IP addr. | PQoS | notification | posmethod |
|---|---|---|---|---|

FIG.7B (SUPL_START)

| session_ID | ms-capability | Location_area_ID | NMR |
|---|---|---|---|

FIG.7C (RLP-REQ)

| session_ID | Location_area_ID | NMR |
|---|---|---|

FIG.7D (RLP-RSP)

| session_ID | rough_Position |
|---|---|

FIG. 7E (LLP-REQ)

| Home SLC IP addr. | pseudo_session ID | rough_Position |
|---|---|---|

FIG. 7F (LLP-RSP)

| pseudo_session ID | assistant data |
|---|---|

FIG. 7G (SUPL_RSP)

| session_ID | pseudo_session ID | SPC_IP addr. | assistant data |
|---|---|---|---|

FIG. 7H (PDINIT)

(PDRPT)

(MLP-SLIA)

POSITIONING APPARATUS AND METHOD OF A MOBILE TERMINAL USING A POSITIONING SERVER INDEPENDENTLY CONSTRUCTED ON A NETWORK

PRIORITY

This application claims priority to an application entitled "Positioning Apparatus of Mobile Terminal Using Positioning Server Independently Constructed on Network and Method Thereof" filed in the Korean Industrial Property Office on Apr. 21, 2004 and assigned Serial No. 2004-27639, the contents of which are hereby incorporated by reference.

BACKGROUND OF THE INVENTION

1. Field of the Invention

The present invention relates generally to a positioning apparatus of a mobile terminal using a positioning server independently constructed on a network and a method thereof, and more particularly to a positioning apparatus and method of a mobile terminal using a positioning server independently constructed on a network, such that the positioning of a roaming mobile terminal using an SUPL (Secure User Plane Location) using an IP (Internet Protocol)-based network is performed. Additionally, the present invention is applicable to a positioning service on a control plane in addition to a positioning service on a user plane.

2. Description of the Related Art

As mobile terminals become more lightweight and small-sized, users' abilities to carry and use their mobile terminals have increased. Additionally, under the environment of a global mobile communication system, many users intend to receive application services (for example, traffic and living information) using position information of the mobile terminals. Accordingly, in some countries or mobile communication network territories (for example, territories of Korean mobile communication networks such as SK Telecom, KTF, or Japanese and European mobile communication networks such as NTT DoCoMo, Sprint PCS, KDDI, or Vodafone), mobile terminal position information acquisition systems using such mobile terminals have already been commercialized.

In order to provide the application services using position information, as described above, a process of positioning a mobile terminal should precede. That is, the application services using position information should be provided based on geographical position information of the mobile terminal, which is obtained in the process of positioning the mobile terminal.

FIG. 1 schematically illustrates a conventional mobile communication system. In particular, FIG. 1 illustrates a GSM (Global System for Mobile communication) or UMTS (Universal Mobile Telecommunication System) mobile communication system.

Referring to FIG. 1, the UMTS mobile communication system includes a CN (Core Network) 110, a plurality of RNSs (Radio Network Subsystems) 120 and 130, and a UE (User Equipment) 150. The CN 110 manages information of the UE 150, and performs mobility management, session management, and call management. As such, the RNS 120 or 130 includes an RNC (Radio Network Controller) and a plurality of base stations (i.e., node Bs). For example, the RNS 120 includes an RNC 121, a node B 123, and a node B 125, and the RNS 130 includes an RNC 131, a node B 133, and a node B 135.

The RNCs 121 and 131 can be classified as a serving RNC (SRNC), a drift RNC (DRNC), or a controlling RNC (CRNC) according to their operation. That is, the RNC that manages information of UEs that belong to the corresponding RNC and controls data transmission between UEs and the CN 110 through an interface Iu is called an SRNC. The RNC that relays data transmission between the UE belonging to another RNC and the RNC to which the UE belongs (for example, an SRNC) is called a DRNC. The RNC that controls the respective base stations (i.e., node Bs) is called a CRNC.

In FIG. 1, if the RNC 121 manages the information of the UE 150, it operates as the SRNC of the UE 150. If the UE 150 moves and the UE 150 and the RNC 121 transmit and receive data through the RNC 131, the RNC 131 operates as the DRNC of the UE 150. The RNC 121 that controls the base station (i.e., node B) 125, which is communicating with the UE 150, becomes the CRNC of the base station 125. The information and data of the UE 150 is transmitted to the CN 110 through the RNC 121 that is the SRNC of the UE 150.

In the mobile communication network as described above, diverse positioning techniques for positioning the UE have been used, and three representative techniques will be described herein below.

A first method performs the positioning of the UE in the unit of a cell using information of a cell that is the nearest cell to the UE or that manages the UE. A second method is a network-based positioning method for calculating the strength of a signal using a measurement signal between the node B and UE or a time of arrival (TOA) or a time difference of arrival (TDOA), which is obtained from the transfer time of radio waves, and positioning the UE by applying a triangular surveying method to the TOA or TDOA. A third method for positioning the UE uses a GPS (Global Positioning System) developed by the United States Department of Defense. By supplementing and applying the GPS-technology among the positioning method using the GPS to a mobile communication system, a network-assisted GPS (network-AGPS) has been proposed.

Conventionally, if a location service client (LCS client) outside a network requests the position of a specified UE, a preparatory process for performing the positioning of the UE is performed, a signal required for the positioning is measured, and the position of the UE is calculated according to the measured signal. More specifically, in the preparatory process, a privacy indicator such as a privacy limit of the UE is examined, resources of the network are allocated, and a positioning technique is selected according to a QoS (Quality of Service) requested by an LCS client and the performance of the UE and the network.

Additionally, the position measurement process is performed between a UTRAN (Universal Terrestrial Random Access Network) and the UE, such that the signal required for the position measurement is acquired according to the positioning technique selected in the preparatory process, and then the position of the UE is calculated. In this case, the UE should be an individual UE for which the MSISDN (Mobile Subscriber ISDN Number) or IMSI (International Mobile Subscriber Identity) is already known.

The position measurement process described above is frequently performed if the UE deviates from a home gateway mobile location center (GMLC) at which the UE itself is registered in the CN and is located at another GMLC, or if the positioning service is requested by an external LCS client or the UE itself. In this case, the GMLC manages position information of UEs located in PLMN (Public Land Mobile Network). A PLMN is a geographically or logically separable mobile communication network, and at least one GMLC may exist in one PLMN.

FIG. 2 is a flowchart illustrating a conventional method of positioning a mobile terminal. In particular, FIG. 2 illustrates the positioning process if the external LCS client (hereinafter referred to as a 'client') 160 requests the position of the UE_A 155.

Referring to FIG. 2, the client 160 requests the location service (LCS) for the UE, of which the client 160 wants to know the position, to a connected GMLC 111 in step S11. That is, the client 160 requests the position information of the UE_A 155. Because the GMLC 111 requests the position of the UE_A 155, it is represented as a 'requesting GMLC' in FIG. 2.

The requesting GMLC 111 requests the home PLMN information of the UE_A 155 from an HLR/HSS (Home Location Register/Home Subscriber Server) 115 in step S13, and receives the home PLMN information from the HLR/HSS 115 in step S15. The HLR/HSS 115 is a server that stores registrants information and roaming information of the stored UEs, and responds to the request of the requesting GMLC 111 using the stored registrants information of the UEs. That is, the HLR/HSS provides the home PLMN information of the UE_A 155 to the requesting GMLC 111 in step S15.

The requesting GMLC 11 that has received the home PLMN information of the UE_A 155 at step S15 requests the information about the PLMN in which the UE_A 155 is located from the home GMLC 113 of the UE_A 155 using the home PLMN information in step S17. The home GMLC 113 performs a privacy authentication process in step S19, receives visited PLMN information of the UE_A 155 from the HLR/HSS 115 in steps S21 and S23, and requests the position information of the UE_A 155 from the GMLC 117 of the PLMN that the UE_A 155 is visiting, using the visited PLMN information in step S25. Because the GMLC 117 is the GMLC of the PLMN that the UE_A 155 is visiting, it is called a 'visited GMLC'.

The visited GMLC 117 in the PLMN that the UE_A 155 is visiting, an MSC/SGSN (Mobile-services Switching Center/serving GPRS (General Packet Radio Service) Support Node) 119, a RAN (Radio Access Network), and the UE_A 155 calculate the position of the UE_A 155.

Typically, in the mobile communication network, a positioning method such as a cell identification technique, a TDOA technique, an A-GPS technique, etc., is used as described above. Accordingly, the PLMN that the UE_A 155 is visiting can measure the position of the UE_A 155 using any one of the three methods.

Meanwhile, the measurement of the position performed by the above-described methods may be classified into two methods according to the burden of network resources or the subject of position calculation. That is, the position measurement method may be classified into a UE-based method for calculating the position of the UE itself, using pseudo-range information and positioning-assisted information, and a UE-assisted method for obtaining pseudo-range information using a GPS satellite signal acquisition assistant data (for example, A-GPS assistant data) and then transferring the pseudo-range information to the corresponding RNC that manages the LCS service of the UE for the network's calculation of the position of the UE.

In the process illustrated FIG. 2, the UE_A position information request transferred to a visited GMLC 17 of the UE_A 155 is transmitted to the RAN 170 through the MSC/SGSN 119. If the corresponding RNC sends the A-GPS assistant data of the UE_A 155 to the UE_A 155 and the UE_A 155 calculates the position of the UE_A 155 itself, the position measurement method is UE-based. However, if the UE_A 155 sends the GPS pseudo-range information obtained by the UE_A 155 to the RNC and the network calculates the position of the UE_A 155, the position measurement method is UE-assisted.

If the position of the UE_A 155 is calculated by one of the UE-based and UE-assisted methods in step S27, the visited GMLC 117 transfers its result (i.e., the position information of the UE_A) to the home GMLC 113. The home GMLC 113 performs the authentication process again at step S31, and then transfers the position information of the UE_A 155 transferred from the visited GMLC 117 to the client 160 through the requesting GMLC 111 in steps S33 and S35.

FIG. 3 is a block diagram schematically illustrating a conventional network for performing the positioning of a mobile terminal. Referring to FIG. 3, in order to provide the mobile terminal positioning service, the network should include a positioning service permission module and a position calculation service module. For example, in order to perform the positioning of a terminal A (not illustrated) in a state in which the terminal A deviates from a home network 210 and is roaming to a visited network 220, the home network 210 and the visited network 220 should include a positioning service permission modules 211 and 221, and position calculation service modules 213 and 223, respectively. The positioning service permission modules 211 and 221 (for example, LMUs) perform the authentication of the mobile terminal subject to positioning and a privacy protection function, and support data transmitted between HLR and VLR in order to perform the authentication and privacy protection function. Further, the position calculation service modules 213 and 223 (for example, PDE (Position Determination Entity) perform an assistant data generation related to the position calculation and a calculation process.

Accordingly, the home network 210 that has received the request for the position information of the terminal A authenticates the position information request and the privacy protection function of the terminal A. If it is possible to respond to the position information request, the home network 210 requests the position information of the terminal A from the position calculation service module 223 of the visited network 220 using the position calculation service module 213, and then calculates the position of the terminal A after receiving the response to the position information request.

However, the conventional method of positioning the mobile terminal as described above, has the drawbacks in that if there is no position calculation system (for example, LMU (Location Measurement Unit), or PDE) that is additionally provided according to mobile communication service providers in the network, it cannot provide the positioning service according to the request of the external LCS client or mobile terminal.

Consequently, if the network that is not provided with the position calculation system receives the positioning service request from the mobile terminal, it must respond with a failure to the request or use the position calculation system provided another network by accessing the network that can prove the positioning service.

However, in using the position calculation system provided in another network that can provide the positioning service, the network that can provide the positioning service may reject the use permission of the position calculation system or may exclusively use the positioning system.

Additionally, when a home network performs the positioning of a mobile terminal that deviates from the home network and is located in another network, the accuracy of assistant data to be transferred to the terminal may deteriorate. This causes the accuracy of the positioning to deteriorate if the positioning is performed using the PDE.

SUMMARY OF THE INVENTION

Accordingly, the present invention has been designed to solve the above and other problems occurring in the prior art, and an object of the present invention is to provide a positioning apparatus of a mobile terminal and a method thereof, which obtain an accurate positioning result with a reduced cost for implementation of a positioning system.

Another object of the present invention is to provide a positioning apparatus and method of a mobile terminal for positioning the mobile terminal by sharing a positioning server independently implemented on a network with other networks.

Another object of the present invention is to provide a positioning apparatus and method of a mobile terminal that can separate a positioning service permission module and a position calculation service module that are required for the positioning of the mobile terminal from each other and perform the positioning of the mobile terminal using the separated modules.

In order to accomplish the above and other objects, there is provided a positioning apparatus of a mobile terminal. The apparatus includes a positioning server, independently constructed on a network, for collecting, storing, and managing assistant data that includes orbit information and correction information of a satellite, and providing the assistant data or position information using the assistant data in response to an external request. The positioning server provides the position information of the terminal subject to positioning in response to the request for the position information of the terminal subject to positioning created from at least one network among a plurality of networks that share the positioning server.

Additionally, there is provided a positioning method of a mobile terminal using a positioning server independently constructed on a network. The method includes the steps of receiving a request for position information of a specified mobile terminal, calculating physical position information corresponding to logical position information about a visited network of the mobile terminal in response to the position information request, transferring the physical position information to the positioning server, receiving assistant data of the mobile terminal from the positioning server, calculating the position of the mobile terminal using the assistant data, and transferring a result of calculation for the position of the mobile terminal.

Additionally, there is provided a positioning method of a mobile terminal that is roaming to a visited network provided with a position calculation service module constructed independently of a positioning service permission module. The method includes the steps of receiving, in a home network, a request to provide position information of the mobile terminal, providing, by the home network, access information for a position calculation service module of the visited network to the mobile terminal, directly accessing the position calculation service module of the visited network using the access information by the mobile terminal, and calculating and determining the position of the mobile terminal by the position calculation service module.

BRIEF DESCRIPTION OF THE DRAWINGS

The above and other objects, features, and advantages of the present invention will be more apparent from the following detailed description taken in conjunction with the accompanying drawings, in which:

FIGS. 7A to 7K are views illustrating messages being transmitted during the positioning of the mobile terminal according to an embodiment of the present invention.

DETAILED DESCRIPTION OF THE PREFERRED EMBODIMENTS

Figure 1:
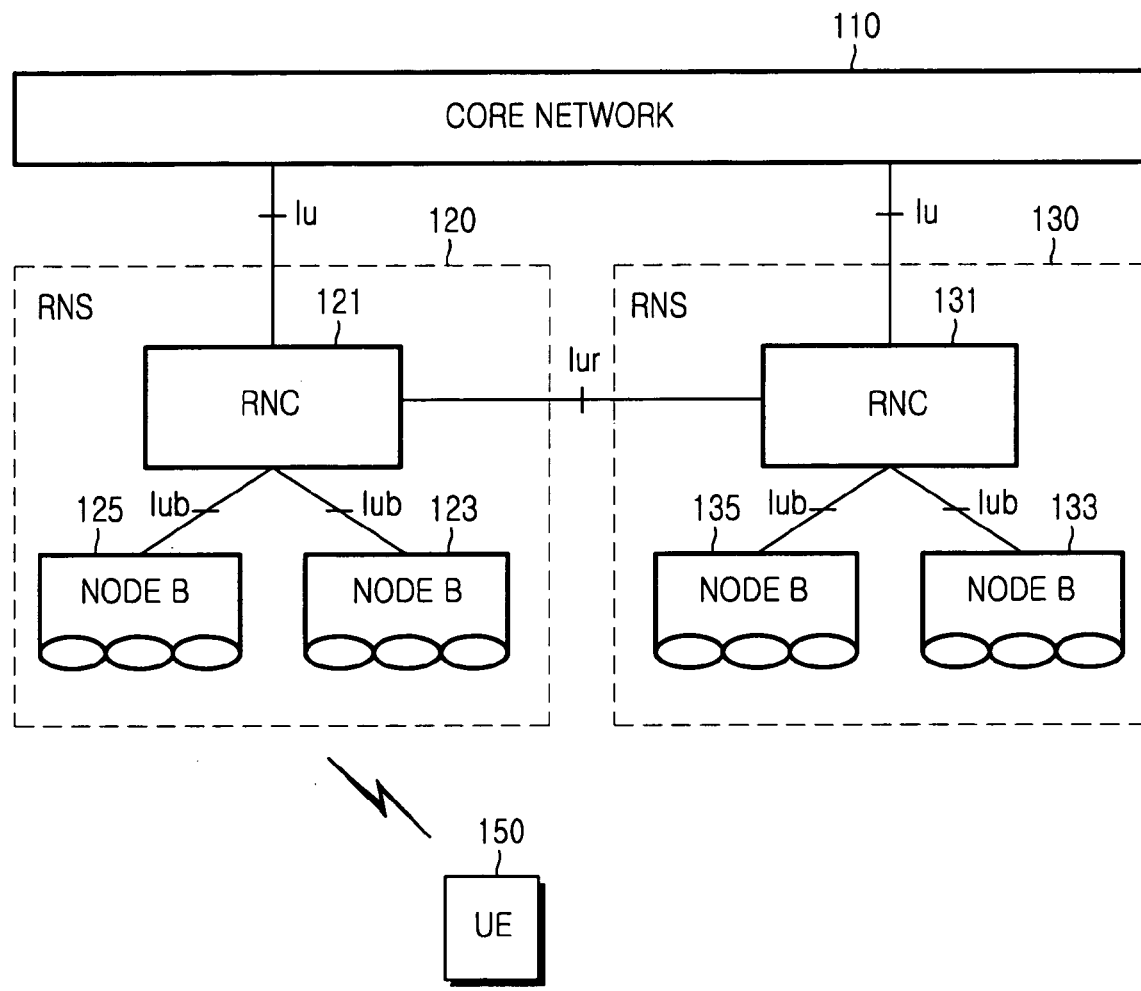
FIG. 1 illustrates a conventional mobile communication system.
Figure 2:
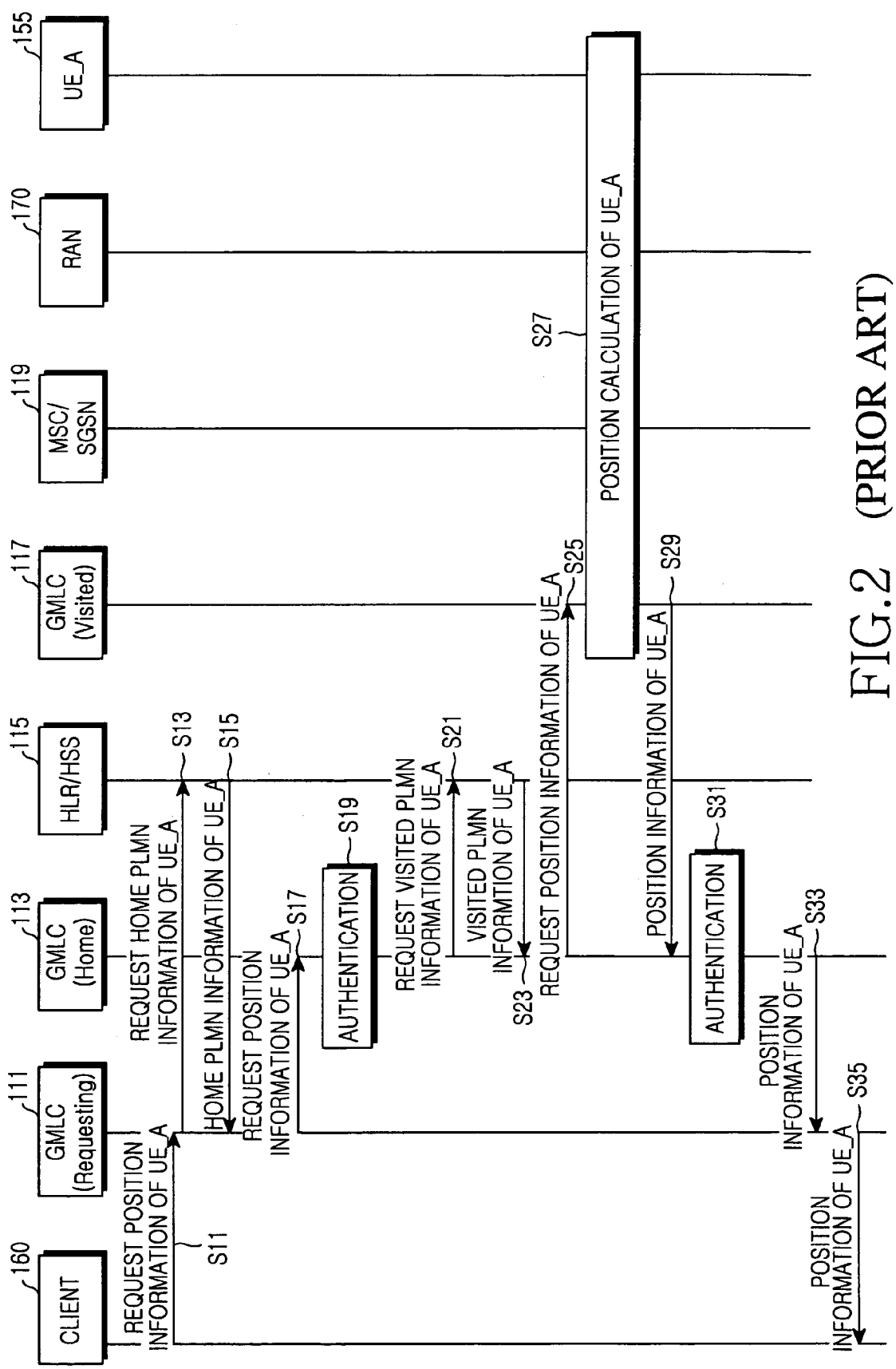
FIG. 2 is a flowchart illustrating a conventional positioning method of a mobile terminal.
Figure 3:
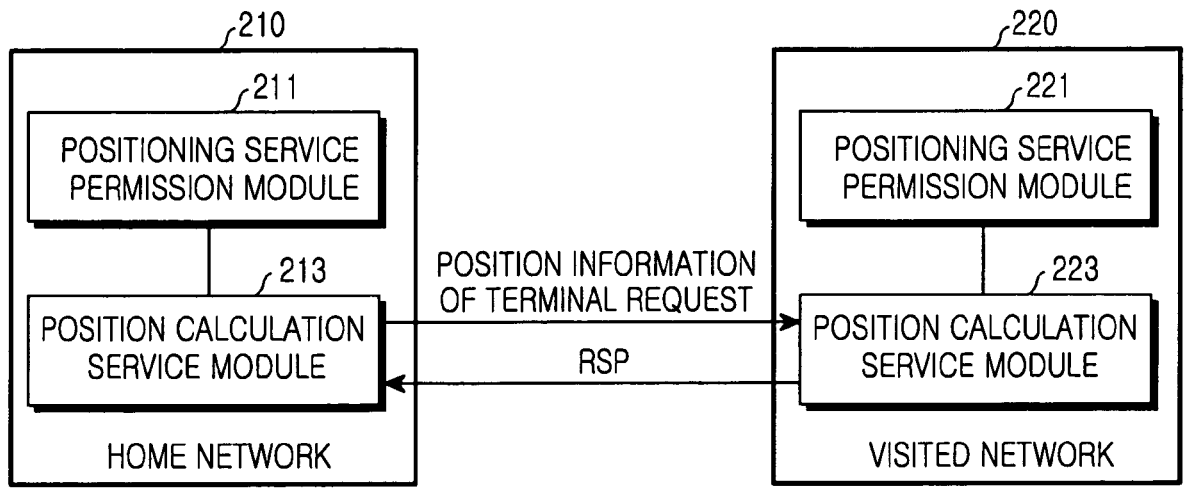
FIG. 3 is a block diagram schematically illustrating a conventional network for performing a positioning of a mobile terminal.

Preferred embodiments of the present invention will be described in detail hereinafter with reference to the accompanying drawings. In the following description of the present invention, the same drawing reference numerals are used for the same elements even in different drawings. Additionally, a detailed description of known functions and configurations incorporated herein will be omitted when it may obscure the subject matter of the present invention.

Figure 4:
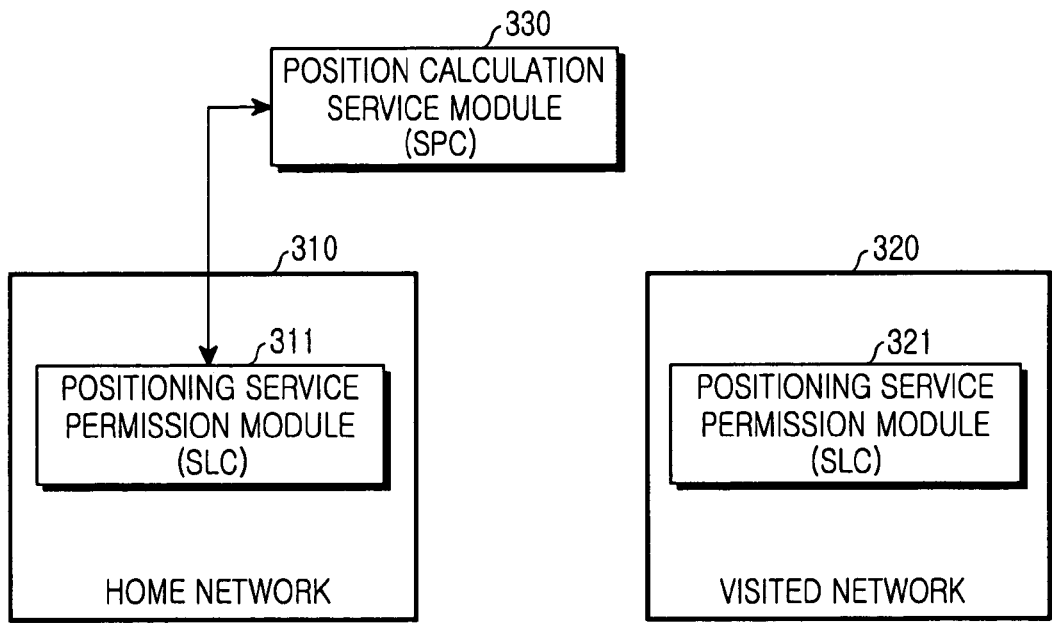
FIG. 4 is a block diagram schematically illustrating a network for performing the positioning of a mobile terminal according to an embodiment of the present invention.

FIG. 4 is a block diagram schematically illustrating a network for performing the positioning of a mobile terminal according to an embodiment of the present invention. Referring to FIG. 4, a network 310 or 320 for performing the positioning of the mobile terminal according to an embodiment of the present invention includes only a positioning service permission module 311 or 321 (for example, an SUPL location center (SLC). A position calculation service module 330 (for example, an SUPL positioning center (SPC) is implemented independently of the network.

If a terminal B, which is registered in the home network 310, is roaming to the visited network 320, the positioning of the terminal B is performed in a manner that an authentication procedure and so on is performed with respect to a request for a positioning service of the terminal B using the SLC 311 provided in the home network 310. Thereafter, functions related to the position calculation (for example, creation of assistant data, position calculation, etc.) are performed using the SPC 330 implemented independently of the home network 310.

The SPC 330 is a function module repeatedly owned by the respective network. In the embodiment of the present invention, this function module is implemented independently of the networks, and is shared by the respective networks. Functions performed by the SPC 330 may be a position calculation, assistant data delivery, retrieval function, etc. That is, if the position information request is permitted, the SPC 330 processes only work for the requested position calculation of the corresponding terminal.

A plurality of SPCs may be provided for the respective networks. However, it is also possible to implement an SPC in a certain network, and other networks share the SPC. If plurality of SPCs 330 exist, it is preferable to perform the positioning by selecting the SPC that is located nearest to the terminal subject to positioning.

Before performing the position calculation of the roaming mobile terminal, the SLC 311 or 321 performs a search for data between HLR and VLR in order to support necessary procedures of the mobile terminal, for example, authentication (or authorization), privacy checking, charging, roaming support, etc. That is, the SLC 311 or 321 determines whether to permit or return the position information request from the external client or the terminal itself.

Figure 5:
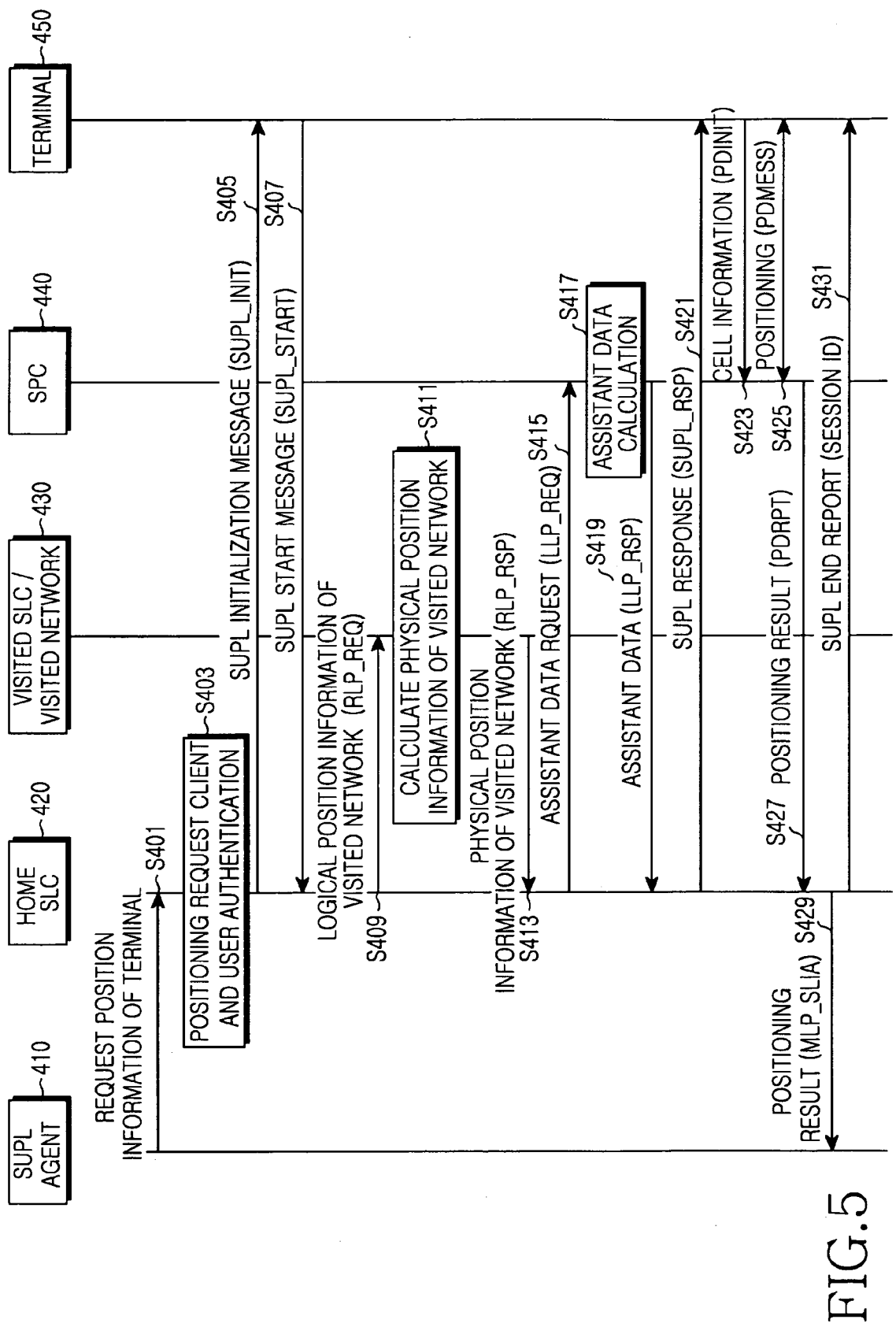
FIG. 5 is a flowchart illustrating a positioning method of a mobile terminal according to an embodiment of the present invention.
Figure 6:
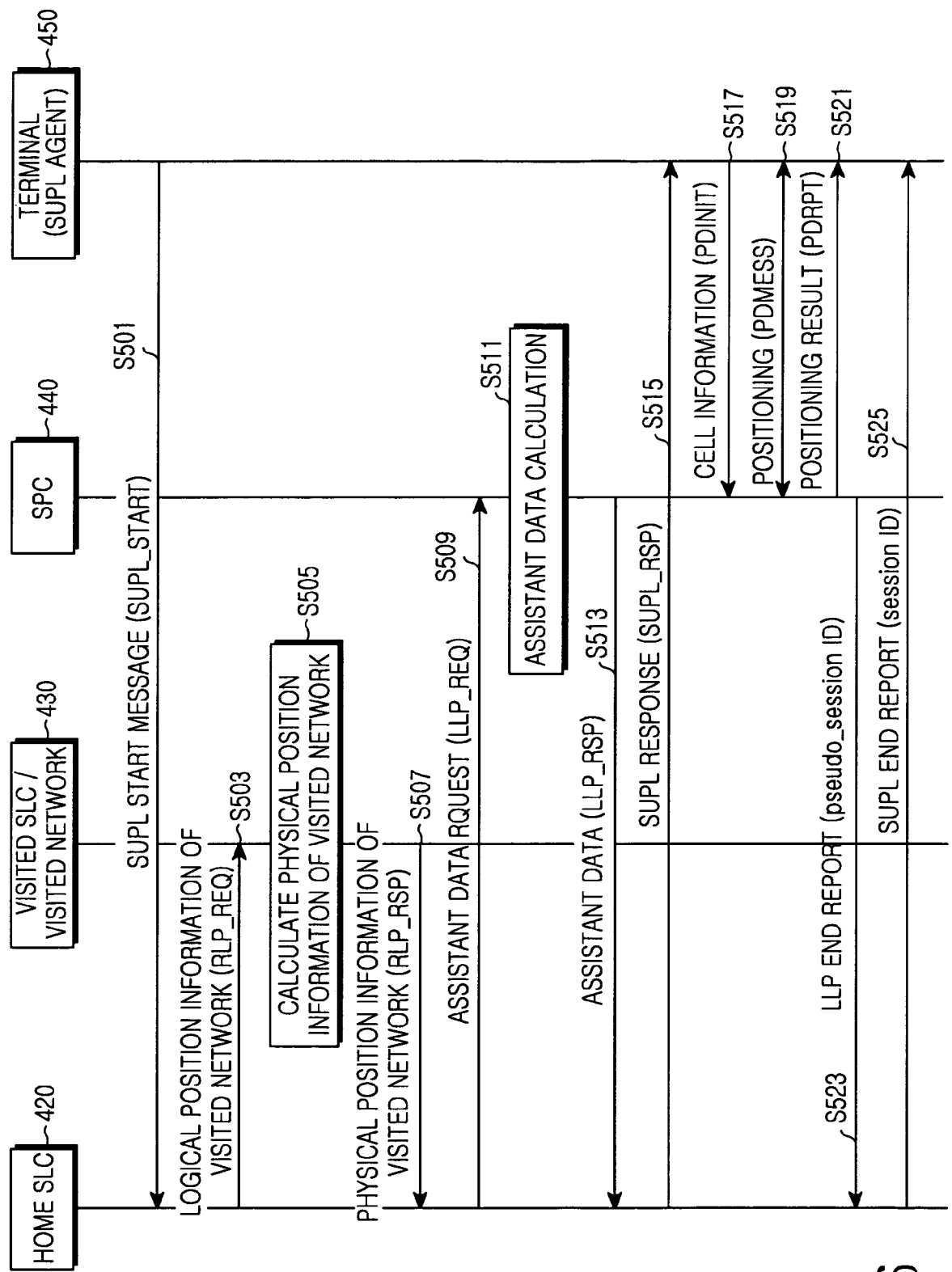
FIG. 6 is a flowchart illustrating a positioning method of a mobile terminal according to another embodiment of the present invention.

FIGS. 5 and 6 are flowcharts illustrating a positioning method of a mobile terminal according to first and second embodiments of the present invention. That is, FIG. 5 illustrates the positioning method in the event that a network that has received a request for the position of a specified mobile terminal (hereinafter referred to as a 'terminal') from a third party (for example, an external client) requests the position measurement of the corresponding terminal (i.e., a 'network-initiated request), and FIG. 6 illustrates the positioning method in the even that the terminal requests its own position information (i.e., a 'terminal-initiated' request).

Referring to FIG. 5, the positioning method of a roaming terminal that is performed in the event that a request is 'network-initiated', terminal-assisted, and corresponds to an immediate service according to an embodiment of the present invention will be explained.

An SUPL agent 410 that has received a request for position information of a terminal 450 from an outside (for example, an external client) creates and transfers a position information request message MLP_SLIR using an MLP (Mobile Location Protocol) to a home SLC 420 in step S401. In this case, the SUPL agent 410 is a module that is included in all SUPL-serviceable network devices, and creates an MLP message for the SUPL service.

Figure 7I:
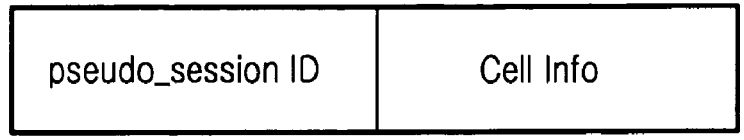

Referring to FIG. 7A, the position information request message MLP_SLIR created at step S401 includes identification (ID) information 'ms_ID' of the terminal 450 subject to positioning, ID information 'LCS-Client_ID' of the external client that has requested the position information of the terminal, and positioning quality information 'PQoS' (for example, accuracy of positioning, degree of a response speed, etc.).

The home SLC 420 performs the authentication of the position-requesting client and the user in step S403.

The home SLC 420 authenticates the external client that has requested the position information of the terminal by checking 'LCS-Client_ID' included in the received 'MLP_SLIR'. For example, the home SLC confirms if the external client is a company registered to use the position information.

The home SLC confirms if the user of the terminal 450 the position of which is requested permits the third party to receive the position information. Accordingly, the home SLC 420 checks a pre-stored privacy profile of the terminal 450.

If it is possible to provide the corresponding service to the client that has requested the position information in step S403, the home SLC 420 informs the corresponding terminal 450 that the position information is requested, and creates and transfers a message SUPL_INIT for initializing the positioning process to the terminal 450 in step S405.

The structure of the message SUPL_INIT transferred to the terminal 450 is exemplarily illustrated in FIG. 7B. Referring to FIG. 7B, the message SUPL_INIT includes a session ID 'session_ID' to be used between the home SLC 420 and the terminal 450 in the corresponding positioning process, an IP address of the home SLC 'Home SLC IP addr.', a positioning quality information 'PQoS', a privacy profile checking result 'notification', and information 'posmethod' about the kind of at least one positioning technique that can be processed.

The terminal that has received the message SUPL_INIT determines whether to permit or return the positioning request by confirming 'notification' included in the message SUPL_INIT. If it is determined to permit the positioning request, the terminal 450 transfers a positioning process start message SUPL_START to the home SLC 420 as a response to the message SUPL_INIT in step S407.

The structure of the message SUPL_START transferred to the home SLC 420 is exemplarily illustrated in FIG. 7C. Referring to FIG. 7C, the message SUPL_START includes a session ID 'session_ID' that is the same as that included in the message SUPL_INIT, information 'ms-capability' about a positioning method of the terminal 450, and position information 'Location_area_ID' of a visited network to which the terminal 450 is roaming.

Optionally, if it is possible for the terminal to additionally transfer information that is helpful when the network calculates the position of the cell in which the terminal itself presently exists, this information can also be included in the message SUPL_START to be transmitted. For example, if the terminal is in a GSM network, an NMR (Network to Mobile Radio signal) is a parameter that indicates a TA (Time of Arrival) of a radio signal transferred from the network to the terminal, a RXLEV (Receiver of power level) of a radio signal transferred to the terminal, etc.

In this case, 'ms-capability' includes a kind of A-GPS (i.e., UE-assisted A-GPS or UE-based A-GPS) used in the terminal 450 and positioning protocol information (such as RRLP, RRC, IS-801, etc.) to be used by the terminal 450.

Additionally, 'Location_area_ID' is a logical ID that indicates a presently roaming area, and instructs the home SLC 420 to search for a visited SLC or visited network 430 in which the terminal 450 is located.

The home SLC 420 searches for the visited network information (for example, the visited SLC) 430 in which the terminal 450 is located by checking 'Location_area_ID' included in 'SUPL_START', and transmits 'Location_area_ID' to the visited SLC 430 using the RLP (Roaming Location Protocol) in step S409. This obtains physical position information rough_position corresponding to 'Location_area_ID'.

In this case, a message RLP_REQ transmitted from the home SLC 420 to the visited SLC 430 may include 'session_ID' and 'Location_area_ID, and may further include 'NMR' as exemplarily illustrated in FIG. 7D.

The visited SLC 430 that has received 'RLP_REQ' from the home SLC 420 calculates physical position information corresponding to 'Location_area_ID' in step S411, includes the result in 'RLP_RSP', and transfers 'RLP_RSP' to the home SLC 420 in step S413. It is preferable that the physical position information rough_position calculated at step S411 is expressed using longitude and latitude values.

The 'RLP_RSP' includes 'session_ID' and 'rough_Position' as illustrated in FIG. 7E.

If 'PQoS' is set to 'low accuracy' in step S401, 'rough_position' information may be the final position information to be sent to the SUPL agent 410. That is, the home SLC 420 transfers 'rough_position' received in step S413 to the SUPL agent 410, and then terminates the corresponding session.

However, if 'PQoS' is set to 'high accuracy', steps following step S413 proceed as illustrated in FIG. 5. More specifically, the home SLC 420 requests the assistant data for calculating more accurate position information to SPC 440 by transferring the 'rough_position' information to SPC 440 existing outside the network or SPC existing in the visited network in step S415. Because the home SLC 420 and SPC 440 use the LLP (Location Protocol) protocol, SLC 420 requests the assistant data to SPC 440 using 'LLP_REQ'.

Referring to FIG. 7F, 'LLP_REQ' includes an IP address of the home SLC 420 'Home SLC IP addr.' for enabling SPC 440 to respond, a 'pseudo_session ID' newly prepared for security during data transmission between the home SLC 420 and SPC 440, and a 'rough_Position'. 'pseudo_session_ID' is optionally created by the home SLC 420, and is used only in the SPC's positioning process. The 'rough_position' is information required for SPC to create more accurate assistant data in consideration of the position of SET.

The home SLC 420 and SPC 440 exchange data with each other through the networks. In the case of data exchange between the home SLC 420 and SPC 440, the security should be strengthened in order to reduce the privacy infringement problem. Accordingly, all messages transmitted between the home SLC 420 and SPC 440 may be encrypted in addition to the user of a separate 'pseudo_session_ID'.

A plurality of SPCs may be distributed in different areas. An SPC may operate independently, and may be included in the home SLC or visited SLC. The home SLC 420 selects SPC 440 existing in the nearest place to the terminal 450, and requests the assistant data for the position calculation of the terminal 450 to the SPC 440.

The SPC 440 that has received the request for the assistant data creates the assistant data on the basis of 'rough_Position' included in 'LLP_REQ' in step S417. The SPC 440 sends 'LLP_RSP' that includes 'pseudo_session_ID' and 'assistant data' as illustrated in FIG. 7G to the home SLC 420 in response to the request for the position assistance information in step S419.

The home SLC 420 that has received the assistant data of the terminal 450 from the SPC 440 creates and transfers a SUPL response message SUPL_RSP for informing the terminal 450 of the reception of the assistant data to the terminal 450 in step S421.

Referring to FIG. 7H, 'SUPL_RSP' includes 'session_ID', 'pseudo_session_ID', 'SPC_IP_addr.', and assistant data. The 'SUPL_RSP' includes 'pseudo_session_ID' and 'SPC_IP_addr' for the terminal 450 to directly connect to SPC 440 and to send and receive messages required in the positioning process.

The terminal 450 that has received 'SUPL_RSP' creates and transfers a PDINIT (Position Determination Initiation) message that includes 'paseudo_session_ID' included in 'SUPL_RSP' and cell information in which the terminal 450 is located (See FIG. 7I) to SPC 440 in step S423. The PDINIT message is used for the terminal 450 to start a direct connection to SPC 440. Because SPC 440 knows 'pseudo_session_ID' of the terminal 450, it enables the SPC 440 to recognize its existence by including 'psedo_session_ID' in the PDINIT message and transferring the PDINIT message to SPC 440.

Additionally, if the terminal 450 can optionally transfer information that is helpful when the network calculates the position of the cell in which the terminal 450 is presently located (such as cell information), such information can also be included in the PDINIT message. For example, if the terminal is in a GSM network, an NMR (Network to Mobile Radio signal) is a parameter that indicates a TA (Time of Arrival) of a radio signal transferred from the network to the terminal, a RXLEV (Receiver of power level) of a radio signal transferred to the terminal, etc. Because the cell information is information that the terminal 450 may have once transferred at step S407, it may repeatedly be transferred at step S423. However, because the cell information transferred at step S407 may be different from the cell information transferred at step S423 due to the change of the radio environment where the terminal 450 exists with the lapse of time, it is preferable that the terminal adds the cell information to the PDINIT message.

The SPC 440 sends and receives PDMESS (Position Determination Message) messages (such as RRLP, IS-801, RRC, etc.) to and from the terminal 450, and exchanges signals required for the positioning and data with the terminal 450 in step S425.

Figure 7J:
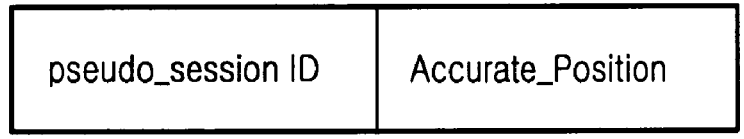

Thereafter, SPC 440 calculates the final position of the terminal 450, and creates and transmits a PDRPT message including a result of calculation 'Accurate_Position' to the home SLC 420 in step S427. The PDRPT message includes 'pseudo_session_ID' and 'Accurate_Position' as illustrated in FIG. 7J.

Figure 7K:
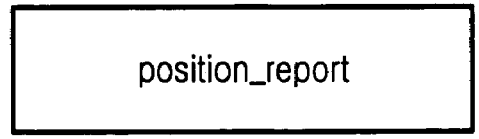

The home SLC 420 identifies the terminal that corresponds to the result of positioning by checking 'pseudo_session_ID' included in the received PDRPT message, and then reports the final position of the terminal to the SUPL agent that requested the positioning of the corresponding terminal in step S429. In this case, the home SLC 420 uses 'MLP_SLIA' as illustrated in FIG. 7K.

Finally, the home SLC 420 transmits an SUPL end message including 'session_ID' to the terminal 450 to terminate the corresponding session in step S431.

Referring to FIG. 6, the positioning method of a roaming terminal that is performed in the event that a request is 'terminal-initiated', network-assisted, and corresponds to an immediate service according to an embodiment of the present invention will be explained.

First, if the terminal 450 that includes the SUPL agent requests the positioning of the terminal itself by transmitting the SUPL start message SUPL_START (See FIG. 7C) to the home SLC 420 in step S501, the home SLC 420 searches for the visited network information (for example, the visited SLC 430) in which the terminal 450 is located by checking 'Location_area_ID' included in 'SUPL_START', and transmits 'Location_area_ID' to the visited SLC 430 using an RLP (Roaming Location Protocol) in step S503. This is for obtaining physical position information 'rough_position' corresponding to 'Location_area_ID'.

An example of the message RLP_REQ transmitted from the home SLC 420 to the visited SLC 430 is illustrated in FIG. 7D. Because the structure of the message has been explained with reference to FIG. 5, the detailed explanation thereof will be omitted here.

The visited SLC 430 that has received 'RLP_REQ' from the home SLC 420 calculates physical position information corresponding to 'Location_area_ID' in step S505, includes the result of calculation in 'RLP_RSP' (See FIG. 7E) and then transfers 'RLP_RSP' to the home SLC 420 in step S507. It is preferable that the physical position information rough_position calculated in step S505 is expressed using longitude and latitude values.

If 'PQoS' is set to 'low accuracy' in step S501, 'rough_position' information may be the final position information to be sent to the SUPL agent 410. That is, the home SLC 420 transfers 'rough_position' received at step S507 to the terminal 450, and then terminates the corresponding session. Otherwise, the steps following step S507 proceed as illustrated in FIG. 6.

The home SLC 420 requests the assistant data for calculating more accurate position information to SPC 440 by transferring the 'rough_position' information to SPC 440 existing outside the network or SPC existing in the visited network in step S509. Because the home SLC 420 and SPC 440 use the LLP (Location Protocol) protocol, the SLC 420 requests the assistant data to SPC 440 using 'LLP_REQ' (See FIG. 7F).

The structure of 'LLP_REQ' has been explained with reference to FIG. 5, thus the detailed explanation thereof will be omitted here.

A plurality of SPCs may be distributed in plural areas. An SPC may operate independently, and may be included in the home SLC or visited SLC. The home SLC 420 selects SPC 440 existing in the nearest place to the terminal 450, and requests the assistant data for the position calculation of the terminal 450 to the SPC 440.

The SPC 440 that has received the request for the assistant data creates the assistant data on the basis of 'rough_Position' included in 'LLP_REQ' in step S511. Thereafter, the SPC 440 sends 'LLP_RSP' that includes 'pseudo_session_ID' and 'assistant data' as illustrated in FIG. 7G to the home SLC 420 in response to the request for the position assistance information in step S513.

The home SLC 420 that has received the assistant data of the terminal 450 from the SPC 440 creates and transfers a SUPL response message SUPL_RSP (See FIG. 7H) for informing the terminal 450 of the reception of the assistant data to the terminal 450 in step S515.

The terminal 450 that has received 'SUPL_RSP' creates and transfers a PDINIT message (See FIG. 7I) to SPC 440 in step S517. The PDINIT message is used for the terminal 450 to start a direct connection to SPC 440. In this case, because SPC 440 knows 'pseudo_session_ID' of the terminal 450, it enables SPC 440 to recognize its existence by including 'psedo_session_ID' in the PDINIT message and transferring the PDINIT message to SPC 440.

Additionally, if the terminal 450 can optionally transfer information that is helpful when the network calculates the position of the cell in which the terminal 450 is presently located (such as cell information), such information can also be included in the PDINIT message. For example, if the terminal is in a GSM network, an NMR (Network to Mobile Radio signal) is a parameter that indicates a TA (Time of Arrival) of a radio signal transferred from the network to the terminal, a RXLEV (Receiver of power level) of a radio signal transferred to the terminal, etc.

Because the cell information is information that the terminal 450 may have once transferred in step S501, it may repeatedly be transferred in step S517. However, because the cell information transferred in step S501 may be different from the cell information transferred in step S517 due to the change of the radio environment where the terminal exists with the lapse of time, it is preferable that the terminal 450 adds the cell information to the PDINIT message.

The SPC 440 sends/receives PDMESS (Position Determination Report) messages (such as RRLP, IS-801, RRC, etc.) to and from the terminal 450, and exchanges signals required for the positioning and data with the terminal 450 in step S519.

Thereafter, SPC 440 calculates the final position of the terminal 450, and creates and transmits a PDRPT message (See FIG. 7J) including a result of calculation 'Accurate_Position' to the terminal 450 in step S521. Then, SPC 440 informs the home SLC 420 of the termination of the positioning process using the LLP protocol in step S523.

The home SLC 420 transmits an SUPL end message including 'session_ID' to the terminal 450 to terminate the corresponding session in step S525.

As described above, according to the present invention, the positioning service permission module that includes the positioning service authentication and the privacy protection function and the position calculation service module that performs the creation of assistant data of the terminal and the position calculation using the assistant data are separated from each other, but a plurality of networks can share the independently implemented position calculation service module. Accordingly, an accurate positioning result can be obtained with a cost for the implementation of the positioning system being reduced.

Additionally, the present invention can prevent a network capable of providing the positioning service from exclusively using the position calculation system, even if the mobile terminal subject to positioning deviates from the home network and is located in another network, the accuracy of assistant data to be transferred to the terminal can be improved.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A positioning apparatus of a mobile terminal, comprising:
    a positioning server, independently constructed on a plurality of communication networks that share the positioning server; and
    a positioning service permission module, constructed based on the networks, for managing registration information of a respective mobile terminal that considers a corresponding network as a home network and authenticating validity of a request for positioning of the respective mobile terminal based on the registration information;
    wherein the positioning server provides assistant data for positioning the respective mobile terminal to the positioning service permission module and provides current position information of the respective mobile terminal calculated using the assistant data when the request for positioning of the respective mobile terminal is received.

2. The positioning apparatus as claimed in claim 1, further comprising at least more positioning server,
    wherein a positioning server that is located in a place nearest to the terminal subject to positioning responds to the request for the position information of the terminal.

3. The positioning apparatus as claimed in claim 1, wherein the positioning server is provided in a specified network and is shared by the plurality of networks.

4. A positioning method of a mobile terminal using a positioning server independently constructed on a network, the method comprising the steps of:
    receiving a request for position information of the mobile terminal;
    informing the mobile terminal that the position information of the mobile terminal is requested based on registration information of the mobile terminal registered in a home network of the mobile terminal in response to the request for the position information;
    calculating physical position information corresponding to logical position information about a visited network of the mobile terminal in response to the position information request;

transferring the physical position information to the positioning server, wherein the positioning server is independently constructed on a plurality of communication networks that share the positioning server;
receiving assistant data of the mobile terminal from the positioning server;
calculating the position of the mobile terminal using the assistant data; and
transferring a result of calculation for the position of the mobile terminal.

5. The positioning method as claimed in claim 4, further comprising the step of determining if the service should be provided in response the request for the position information based on the registration information of the mobile terminal stored in the home network.

6. The positioning method as claimed in claim 5, wherein the assistant data receiving step strengthens a security characteristic of a message exchanged with the positioning server in order to prevent a privacy infringement.

7. The positioning method as claimed in claim 4, wherein the step of calculating the position of the mobile terminal using the assistant data comprises:
calculating the position of the mobile terminal after the mobile terminal that has received access information from a home network to the positioning server directly accesses the positioning server.

8. The positioning method as claimed in claim 4, wherein the request for the position information is performed by an external client outside the network.

9. The positioning method as claimed in claim 4, wherein the request for the position information is performed by the mobile terminal.

10. A positioning method of a mobile terminal that is roaming to a visited network provided with a position calculation service module constructed independently of a positioning service permission module, the method comprising the steps of:
receiving a request to provide position information of the mobile terminal in a home network;
determining if the service should be provided in response to the request for the position information, based on the registration information of the mobile terminal stored in the home network;
providing access information for a position calculation service module of the visited network to the mobile terminal;
accessing the position calculation service module of the visited network using the access information by the mobile terminal; and
calculating and determining the position of the mobile terminal by the position calculation service module.

11. The positioning method as claimed in claim 10, wherein the access information of the position calculation service module is an internet protocol (IP) address.

12. The positioning method as claimed in claim 11, wherein the IP address of the position calculation service module is a separate address different from that of the positioning service permission module.

13. The positioning method as claimed in claim 10, wherein the position calculation service module of the visited network transmits the determined position information of the mobile terminal to the home network.

14. A positioning method of a mobile terminal in a network in which a position calculation service module is constructed separately from a positioning service permission module, the method comprising the steps of:
receiving a request for position information of the mobile terminal by the positioning service permission module of a home network;
determining if service should be provided in response to the request for the position information, based on registration information of the mobile terminal stored in the home network;
providing access information to the mobile terminal for one of a plurality of position calculation service modules located nearest to the mobile terminal;
accessing the position calculation service module using the access information by the mobile terminal; and
calculating the position of the mobile terminal using assistance data by the position calculation service module.

15. The positioning method as claimed in claim 14, wherein the position calculation service module is located in the home network.

16. The positioning method as claimed in claim 14, wherein the position calculation service module is located in a home network in which the mobile terminal is located.

17. The positioning method as claimed in claim 14, wherein the access information of the position calculation service module is an internet protocol (IP) address.

18. The positioning method as claimed in claim 17, wherein the IP address of the position calculation service module is an address that is different from that of the positioning service permission module.

19. A positioning method of a mobile terminal in a network in which a position calculation service module is constructed separately from a positioning service permission module, the method comprising the steps of:
if position information of the mobile terminal is requested, determining if service should be provided in response to the request for the position information, based on registration information of the mobile terminal stored in a home network and receiving access information for one of a plurality of position calculation service modules that is located nearest to the mobile terminal from the home network by the mobile terminal;
accessing the position calculation service module using the access information; and
exchanging signal required for calculation of the position and data with the position calculation service module by the mobile terminal.

20. The positioning method as claimed in claim 19, wherein the position calculation service module is located in the home network.

21. The positioning method as claimed in claim 19, wherein the position calculation service module is located in a home network in which the mobile terminal is located.

22. The positioning method as claimed in claim 19, wherein the access information of the position calculation service module is an internet protocol (IP) address.

23. The positioning method as claimed in claim 22, wherein the IP address of the position calculation service module is an address that is different from that of the positioning service permission module.

24. A positioning method of a mobile terminal that is roaming to a visited network provided with a position calculation service module constructed independently of a positioning service permission module, the method comprising the steps of:
receiving notification informing that position information of the mobile terminal is requested from a positioning service permission module of a home network;
receiving access information for a position calculation service module of a visited network;

accessing the position calculation service module of the visited network using the access information; and receiving position information of the mobile terminal calculated by the position calculation service module.

25. The positioning method as claimed in claim 24, wherein the access information of the position calculation service module is an Internet Protocol (IP) address.

26. The positioning method as claimed in claim 24, wherein receiving access information for a position calculation service module of a visited network comprises:

receiving access information for one of a plurality of position calculation service modules located nearest to the mobile terminal.

* * * * *

UNITED STATES PATENT AND TRADEMARK OFFICE
CERTIFICATE OF CORRECTION

| | | |
|---|---|---|
| PATENT NO. | : 7,616,963 B2 | Page 1 of 1 |
| APPLICATION NO. | : 11/109999 | |
| DATED | : November 10, 2009 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 335 days.

Signed and Sealed this

Nineteenth Day of October, 2010

David J. Kappos
*Director of the United States Patent and Trademark Office*